United States Patent
Pickles (10) Patent No.: US 10,498,757 B2
(45) Date of Patent: Dec. 3, 2019

(54) TELECOMMUNICATIONS DEFENCE SYSTEM

(71) Applicant: Samuel Geoffrey Pickles, Auckland (NZ)

(72) Inventor: Samuel Geoffrey Pickles, Auckland (NZ)

( * ) Notice: Subject to any disclaimer, the term of this patent is extended or adjusted under 35 U.S.C. 154(b) by 55 days.

(21) Appl. No.: 15/510,769

(22) PCT Filed: Sep. 10, 2015

(86) PCT No.: PCT/NZ2015/050137
§ 371 (c)(1),
(2) Date: Mar. 13, 2017

(87) PCT Pub. No.: WO2016/039642
PCT Pub. Date: Mar. 17, 2016

(65) Prior Publication Data
US 2017/0264632 A1    Sep. 14, 2017

(30) Foreign Application Priority Data
Sep. 11, 2014   (NZ) .................................. 630919

(51) Int. Cl.
*G06F 17/00* (2019.01)
*G06F 12/14* (2006.01)
(Continued)

(52) U.S. Cl.
CPC ...... *H04L 63/1433* (2013.01); *H04L 61/2007* (2013.01); *H04L 63/0236* (2013.01);
(Continued)

(58) Field of Classification Search
CPC . H04L 63/1433; H04L 69/22; H04L 63/0281; H04L 63/0823; H04L 67/20;
(Continued)

(56) References Cited

U.S. PATENT DOCUMENTS

2001/0052014 A1    12/2001   Sheymov et al.
2004/0019803 A1*   1/2004    Jahn ....................... G06F 21/577
                                                    726/25
(Continued)

FOREIGN PATENT DOCUMENTS

WO    WO 2016/039642 A1    3/2016
WO    WO 2016/039643 A1    3/2016

OTHER PUBLICATIONS

International Search Report and Written Opinion dated Dec. 23, 2015, issued by the Australian Patent Office in International Application No. PCT/NZ2015/050138, filed Sep. 10, 2015.
(Continued)

*Primary Examiner* — Aravind K Moorthy
(74) *Attorney, Agent, or Firm* — Klarquist Sparkman, LLP (57) ABSTRACT

A telecommunications defence system (TDS) comprises at least one server adapted to communicate with a client telecommunications system (ClientTS) via a telecommunications network, a shielding application (ShieldApp) and a scanning application (ScanApp). The ShieldApp causes the server to generate a shield signal providing at least one shield that shields the ClientTS from at least one external vulnerability. The ScanApp generates a first scanning signal which scans the ClientTS for vulnerabilities without shielding by the shield. The TDS produces a first signal indicative of vulnerabilities of the ClientTS determined by the first scanning signal. The ScanApp generates a second scanning signal which scans the ClientTS for vulnerabilities whilst being shielded. The TDS produces a second signal indicative of vulnerabilities of the ClientTS determined by the second scanning signal. The TDS compares the first and second signals and generates an output indicative of unshielded vulnerabilities.

24 Claims, 2 Drawing Sheets

(51) Int. Cl.
*H04L 29/06* (2006.01)
*H04L 29/12* (2006.01)
*H04L 29/08* (2006.01)

(52) U.S. Cl.
CPC ...... *H04L 63/0281* (2013.01); *H04L 63/0823* (2013.01); *H04L 67/20* (2013.01); *H04L 67/42* (2013.01); *H04L 69/22* (2013.01)

(58) Field of Classification Search
CPC . H04L 63/0236; H04L 67/42; H04L 61/2007; G06F 21/577; G06F 21/57; G06F 21/552
USPC .............................................. 726/13, 22, 25
See application file for complete search history.

(56) References Cited

U.S. PATENT DOCUMENTS

| | | | |
|---|---|---|---|
| 2004/0030887 A1* | 2/2004 | Harrisville-Wolff | H04L 63/0442 713/155 |
| 2004/0148520 A1 | 7/2004 | Talpade et al. | |
| 2006/0156030 A1* | 7/2006 | Saika | G06F 21/567 713/188 |
| 2007/0011727 A1* | 1/2007 | Mielenz | H04L 63/0428 726/6 |
| 2008/0092237 A1 | 4/2008 | Yoon et al. | |
| 2010/0199345 A1* | 8/2010 | Nadir | H04L 63/02 726/11 |
| 2010/0242114 A1 | 9/2010 | Bunker et al. | |
| 2011/0138469 A1* | 6/2011 | Ye | G06F 21/577 726/25 |
| 2012/0054729 A1* | 3/2012 | Sobel | G06F 8/65 717/169 |
| 2013/0019314 A1* | 1/2013 | Ji | H04L 67/02 726/25 |
| 2013/0031294 A1* | 1/2013 | Feng | G06F 9/06 711/6 |
| 2013/0138654 A1* | 5/2013 | Sathish | G06F 17/30023 707/738 |
| 2013/0227640 A1* | 8/2013 | Zhou | H04L 63/1433 726/1 |
| 2013/0263256 A1 | 10/2013 | Dickinson et al. | |
| 2013/0269023 A1 | 10/2013 | Dilley et al. | |
| 2014/0013434 A1 | 1/2014 | Ranum et al. | |
| 2014/0075540 A1 | 3/2014 | Kudla et al. | |
| 2014/0337971 A1* | 11/2014 | Casassa Mont | G06F 21/552 726/22 |
| 2015/0096036 A1* | 4/2015 | Beskrovny | G06F 21/577 726/25 |
| 2015/0143526 A1* | 5/2015 | Jeon | H04L 63/1433 726/25 |
| 2015/0237063 A1* | 8/2015 | Cotton | H04L 63/1433 726/25 |

OTHER PUBLICATIONS

International Search Report and Written Opinion dated Dec. 23, 2015, issued by the Australian Patent Office in International Application No. PCT/NZ2015/050137, filed Sep. 10, 2015.
Tenable Network Security, "Firewall Audit with Active Scanning and Passive Traffic Monitoring"; Published on YouTube Oct. 11, 2012; (viewed on internet Dec. 14, 2015 at URL:https://www.youtube.com/watch?v=jXtLuvp37kl). Screenshot taken of YouTube video site on Mar. 17, 2017.
International Preliminary Report on Patentability, International Application No. PCT/NZ2015/050137, dated Mar. 14, 2017, 9 pages.
First Examination Report, New Zealand Application No. 738092, dated Jan. 24, 2018, 3 pages.
Suto, "Analyzing the Effectiveness of Web Application Firewalls," Nov. 14, 2011, http://www.slideshare.net/lbsuto/analyzing-the-effectiveness-of-web-application-firewalls, 22 pages (available Jan. 23, 2012).

* cited by examiner

TELECOMMUNICATIONS DEFENCE SYSTEM

CROSS REFERENCE TO RELATED APPLICATIONS

This is the U.S. National Stage of International Application No. PCT/NZ2015/050137, filed Sep. 10, 2015, which was published in English under PCT Article 21(2), which in turn claims the benefit of New Zealand Application No. 630919, filed Sep. 11, 2014. The New Zealand application is incorporated herein in its entirety.

FIELD OF THE INVENTION

This invention relates to a telecommunications defence system and more particularly, the invention relates to a telecommunications defence system for shielding a client website and/or network from third party attacks.

BACKGROUND

A client telecommunications system, typically includes a website, and usually at least a back end network which may be connected to the website. The website, and often the back end network, will be connected to a wider, external telecommunications network, such as the internet, to allow third parties to access the website, and sometimes selected parts of the business intranet or another network or networks to which the business is connected.

Such client website(s) and any connected client network(s) can, and should, be subject to a security system which attempts to control access to the website and any related network.

It is common for such a client telecommunications system to be subject to unwanted attacks whereby a third party attempts to access the website and any associated network without permission. Such third party attacks can be used to access/corrupt/download information held on the website and network. Whilst it may not be possible to stop such attacks being attempted, it is desirable to be able to stop such attacks from being successful.

It is known to provide a service whereby a client telecommunications system is scanned for vulnerabilities, being actual and potential flaws and weaknesses in the software and/or hardware of the system. It is also known for the client to perform such scanning themselves. However, such scanning is often not successful or reliable because the client cannot understand the scanning results, does not know how to remediate or repair any problems identified, and only infrequently runs scans of their website and network in any case.

We have provided a service where we scan client telecommunications systems regularly, such as daily for example, and provide suggested solutions and recommendations to any problems identified. However, even with this more rigorous approach, it can remain a problem that security issues are not dealt with. This is often because the issue is too difficult to fix quickly and that website developers sometimes do not know how to fix their code securely. In some cases the software application is relatively old and/or due to be replaced and the client does not want to spend money on an end-of-life application. In some cases the application is developed or provided by a third party and there is a delay in that third party remedying any problem identified.

OBJECT OF THE INVENTION

It is therefore an object of the invention to provide a telecommunications defence system which overcomes or at least ameliorates one or more disadvantages of the prior art, or alternatively to at least provide the public with a useful choice.

Further objects of the invention will become apparent from the following description.

SUMMARY OF INVENTION

Accordingly in one aspect the invention may broadly be said to consist in a telecommunications defence system comprising at least one server adapted to be in communication with a client telecommunications system via a telecommunications network, the telecommunications defence system comprising a shielding application and a scanning application;

the shielding application containing instructions which, when executed on the at least one server, cause the server to generate a shield signal which provides at least one shield operative to shield the client telecommunications system from at least one external vulnerability;

the scanning application containing instructions which, when executed on the at least one server, generate a first scanning signal which scans the client telecommunications system for vulnerabilities without being shielded from the client telecommunications system by the shield, wherein the system produces a first vulnerability signal indicative of any vulnerabilities of the client telecommunications system determined by the first scanning signal;

the scanning application containing further instructions, which when executed on the at least one server, generate a second scanning signal which scans the client telecommunications system for vulnerabilities whilst being shielded from the client telecommunications system by the or each shield, wherein the system produces a second vulnerability signal indicative of any vulnerabilities of the client telecommunications system determined by the second scanning signal;

the telecommunications defence system being further operative to compare the first and second vulnerability signals and to generate an output signal based on the comparison, and indicative of any unshielded vulnerabilities.

The first and second vulnerability signals may be compared to identify any vulnerabilities of the client telecommunications system that are not yet shielded.

The first and second signals may be compared to analyse the trigger(s) caused by the shield(s) functions.

The first and second vulnerability signals may be compared to generate an output signal indicative of any shielded vulnerabilities.

Any shielded vulnerabilities may form the basis of a report which the customer may use to assess the value of the shield service; in which vulnerabilities which would form risks to the customer are shown as shielded, and attack reports in which shielded vulnerabilities and blocked attacks are compared to determine any attacks which would have been successful or high risk if not for the shield(s) being in place.

The first and second scanning signals may be generated sequentially or simultaneously, and in any order. The first scanning signal may be generated before or after generation of the second scanning signal.

The scanning application and the shielding application may be provided on, or in communication with, a single server, or multiple servers in a server network.

The system may be arranged such that the first scanning signal is arranged to bypass the or each shield. In one example, the first scanning signal may be arranged to bypass the server altogether. In another example, the first scanning signal may be arranged to be routed through the server but to bypass the or each shield.

The system may be alternatively or additionally arranged such that the first scanning signal is arranged to pass-through the server, that is, routed to the client telecommunications system via the server, the or each shield of the shield server being inactive.

The first scanning signal preferably comprises an identifier, generated by the scanning application, which identifier is used by the system to control the routing of the first scanning signal and allow the first scanning signal to reach the client telecommunications system.

The identifier may comprise the source IP address of the server. The identifier may comprise an electronic security certificate such as an SSL or TLS certificate for example. The identifier may comprise an electronic signature comprising part of the first scanning signal. In one example, the electronic signature may be embedded into a header of the first scanning signal.

The system may be arranged to generate a pre-scan signal arranged to perform a pre-scan of the client telecommunications system so as to identify vulnerabilities of the client telecommunications system before the first scan is performed, the shielding application being arranged to generate a shield signal or signals in response to the vulnerabilities identified in the pre-scan. In this way, the shielding application can pre-generate a shield or shields to protect the client telecommunications system, prior to the first scan being performed.

The server may comprise part of the client telecommunications system, or comprise a remote server in communication with the client telecommunications system. Where the server is provided remotely, the shield server may be provided in a location of the client, or provided by a third party. The shield and/or scanning applications may be stored on the server, or on more than one server, or stored in cloud storage in communication with the server.

The shield application may comprise, or be operative to generate or activate, a shield or shields comprising a web application firewall (WAF).

The shield application may comprise a shield generator operative to provide mitigation against a particular vulnerability of the client telecommunications system that is identified by the first or second scans by generating or activating an additional shield or shields, in dependence upon the third vulnerability signal. The shield generator may comprise a programmable shield application, stored on, or at least arranged to be in communication with, the server.

The output signal, based on the third vulnerability signal, may therefore be indicative of the effectiveness of the shielding of the client telecommunications system. The output signal may be used to generate a user viewable report for example.

The system may be arranged to generate a correlation signal, correlating an attack detected on the client telecommunications system, with a vulnerability identified by the first of second scans. The system may process the correlation signal to generate an alarm signal. Thus the system may be arranged to increase the accuracy of any risk profiling conducted on the client telecommunications system by correlating a detected attack with a vulnerability that has already been identified.

According to a second aspect, the invention may broadly be said to consist in a server or server network of a telecommunications defence system, the server being adapted to be in communication with a client telecommunications system via a telecommunications network, the server or server network comprising a shielding application and a scanning application;

the shielding application containing instructions which, when executed on the at least one server, cause the server to generate a shield signal which provides at least one shield operative to shield the client telecommunications system from at least one external vulnerability;

the scanning application containing instructions which, when executed on the at least one server, generate a first scanning signal which scans the client telecommunications system for vulnerabilities without being shielded from the client telecommunications system by the shield, wherein a first vulnerability signal is produced indicative of any vulnerabilities of the client telecommunications system determined by the first scanning signal;

the scanning application containing further instructions, which when executed on the at least one server, generate a second scanning signal which scans the client telecommunications system for vulnerabilities whilst being shielded from the client telecommunications system by the or each shield, wherein a second vulnerability signal is produced indicative of any vulnerabilities of the client telecommunications system determined by the second scanning signal;

the server being further operative to compare the first and second vulnerability signals and to generate an output signal based on the comparison, and indicative of any unshielded vulnerabilities.

According to a third aspect the invention may broadly be said to consist in a method of defending a client telecommunications system using a telecommunications defence system comprising at least one server adapted to be in communication with the client telecommunications system via a telecommunications network, the telecommunications defence system comprising a shielding application and a scanning application; the method comprising steps of:

executing instructions of the shielding application on the at least one server to cause the server to generate a shield signal which provides at least one shield operative to shield the client telecommunications system from at least one external vulnerability;

executing instructions of the scanning application on the at least one server to generate a first scanning signal which scans the client telecommunications system for vulnerabilities without being shielded from the client telecommunications system by the shield;

producing a first vulnerability signal indicative of any vulnerabilities of the client telecommunications system determined by the first scanning signal;

executing further instructions of the scanning application on the at least one server to generate a second scanning signal which scans the client telecommunications system for vulnerabilities whilst being shielded from the client telecommunications system by the or each shield;

producing a second vulnerability signal indicative of any vulnerabilities of the client telecommunications system determined by the second scanning signal;

comparing the first and second vulnerability signals and generating an output signal based on the comparison, and indicative of any unshielded vulnerabilities.

According to a fourth aspect, the invention may broadly be said to consist in a telecommunications network comprising a telecommunications defence system provided with at least one server adapted to be in communication with a client telecommunications system via a telecommunications network, the telecommunications defence system comprising a shielding application and a scanning application;

the shielding application containing instructions which, when executed on the at least one server, cause the server to generate a shield signal which provides at least one shield operative to shield the client telecommunications system from at least one external vulnerability;

the scanning application containing instructions which, when executed on the at least one server, generate a first scanning signal which scans the client telecommunications system for vulnerabilities without being shielded from the client telecommunications system by the shield, wherein the system produces a first vulnerability signal indicative of any vulnerabilities of the client telecommunications system determined by the first scanning signal;

the scanning application containing further instructions, which when executed on the at least one server, generate a second scanning signal which scans the client telecommunications system for vulnerabilities whilst being shielded from the client telecommunications system by the or each shield, wherein the system produces a second vulnerability signal indicative of any vulnerabilities of the client telecommunications system determined by the second scanning signal;

the telecommunications defence system being further operative to compare the first and second vulnerability signals and to generate an output signal based on the comparison, and indicative of any unshielded vulnerabilities.

Further aspects of the invention, which should be considered in all its novel aspects, will become apparent from the following description.

DRAWING DESCRIPTION

A number of embodiments of the invention will now be described by way of example with reference to the drawings in which.

DETAILED DESCRIPTION OF THE DRAWINGS

Throughout the description like reference numerals will be used to refer to like features in different embodiments.

Referring to the Figures, a telecommunications defence system 1 comprises at least one server 3 adapted to be in communication with a client telecommunications system 5 via a telecommunications network 7.

In this example a single server 3 is provided although it is envisaged that multiple servers may be provided if required, as a server network. The server 3 comprises, or is connected to, a power source 9 which powers an electronic data processor 11, a memory 13 and, optionally, a display 15. Suitable control software applications and/or hardware applications are provided on the server 3 as is known, to control the server 3. The, or additional, control application(s) may be stored externally of the server, for example, in cloud storage, the server 3 being in communication with such remote storage.

The client telecommunications system 5 may comprise a client website, or a more complex client telecommunications network which is connected to the telecommunications network 7.

The telecommunications defence system 1 further comprises a shielding application 17 and a scanning application 19. Applications 17, 19 may comprise software or hardware applications provided on the server 3, or may comprise applications stored remotely, such as in cloud storage but accessible by the server 3.

The shielding application 17 contains instructions which, when executed on the at least one server 3, cause the server 3 to generate a shield signal which provides a shield operative to shield the client telecommunications system 5 from at least one external vulnerability. The external vulnerability could comprise any vulnerability of the client website or network to external attack by a third party. Such a vulnerability may comprise one or more application vulnerabilities (such as SQL injection or Cross-site scripting) or infrastructure vulnerabilities (such as open ports or unpatched services). Such vulnerabilities may include any one or more of the following example vulnerabilities:

OWASP top ten web application vulnerabilities;
Injection;
Broken Authentication and Session state management;
Cross site scripting;
Insecure direct object references;
Security misconfiguration;
Sensitive data exposure;
Missing functional level access control;
Cross site request forgery;
Components with known vulnerabilities; and
Unvalidated redirects and forwards.

The scanning application 19 contains instructions which, when executed on the at least one server 3, cause the server 3 to generate a first scanning signal 23 which performs a first scan of the client telecommunications system 5 without the first scanning signal 23 being shielded from the client telecommunications system 5 by the or each shield. The system 1 produces a first vulnerability signal indicative of any vulnerabilities of the client telecommunications system 5 determined by the first scan.

The scanning application 19 contains further instructions, which when executed on the or each server 3, generate a second scanning signal 25 which performs a second scan of the client telecommunications system 5, with the second scanning signal 25 being shielded from the client telecommunications system 5 by the or each shield.

The system 1 produces a second vulnerability signal indicative of any vulnerabilities of the client telecommunications system 5 determined by the second scan.

The system 1 subsequently compares the first and second vulnerability signals and generates an output signal based on the comparison, and indicative of any unshielded vulnerabilities of the client telecommunications system 5.

The first and second signals may therefore be compared to identify any vulnerabilities of the client telecommunications system 5 that are not yet shielded. The first and second signals may alternatively or additionally be compared to analyse the trigger(s) caused by the shield(s) functions. A trigger in this context may be a message, signal or other form of acknowledgement that the shield(s) functions positively recognised the first and/or second signals and therefore successfully triggered a shielding event.

The first scanning signal 23 is therefore allowed to reach the client telecommunications system 5 unshielded, that is, without being blocked or controlled by the shield application 17. The first scanning signal 23 may therefore be processed by the server 3 to identify a broad list of all of the vulnerabilities of the client telecommunications system 5 when unshielded. It is to be noted that the first scanning signal, whilst unshielded, is arranged to be identified by the system 1 and allowed to reach the client telecommunications systems unshielded only once identified as being a legitimate scanning signal.

The second scanning signal 25 is used to assess the effectiveness of the shield or shields generated and/or activated by the shield application 17. The second scanning signal 25 is therefore used to determine any vulnerabilities still present in the client telecommunications system 5, even when the shield or shields are generated and/or activated by the shield application 17.

By comparing the vulnerabilities identified when the system 1 is in an unshielded condition with those identified by the system 1 when in a shielded condition, it is determined which, if any, vulnerabilities remain a risk.

The system 1 may be operative to generate or activate an additional shield or shields directed to shielding any remaining vulnerabilities.

The use of a first unshielded vulnerability scan and a second, shielded vulnerability scan enables an accurate, effective, and robust assessment of the security of a client telecommunications system, and a targeted and accurate approach to improving that security.

It will be appreciated that the shield application 17 and the scanning application 19 may be provided on the same or separate servers 3 and/or may be a single application in which the shielding and scanning functions are integrated.

In normal use, the, or one, server 3 of the telecommunications defence system 1 may function as a proxy server via which traffic to and from the client telecommunications system 5 is routed. During the first scan, the scanning signal can be routed via the server 3 as normal, but with the shield(s) inactive or with traffic routed through the server 3 but around the shield(s). The scanning signal can alternatively be routed through a different network, that is not via the server 3.

Shield Technical Overview

The server(s) 3 are either installed on the client's website, hosted in data-centres for a client or are owned by the provider of the scanning/shielding service and located globally in cloud shield locations.

Wherever the server(s) is located the process can be the same. The process may begin with a pre-scan wherein:
a) The client's website has already been pre-scanned by the, or another, scanning application, and a penetration test has been performed to detail the exact vulnerabilities for this website.
b) Custom shield-objects have been created for each vulnerability identified.
c) Attack traffic hits the server(s) and the shield(s) block their requests, meaning they never hit the vulnerable client website.
d) Legitimate traffic is allowed through the shields and hits the client website as per usual.

Scan and Shield System and Methodology

The system 1 is operative according to a unique process of scanning and shielding.

To achieve this:
e) The client's website is accessible via server(s) 3; ie migration onto the cloud service by modification of DNS records is completed, and user traffic is proxied via server(s) 3.
f) The client website has already been pre-scanned by to detect security vulnerabilities, and in some cases a penetration test has been performed to detail the exact issues for this website.
g) Custom shield-objects have been created for each vulnerability. This process involves, for example, the configuration of the shield application 17 web application firewalls to prevent exploitation of any relevant known vulnerabilities, and retesting has been performed to ensure that such vulnerabilities are mitigated.
h) The scanning application 19 on the internet scans the client's website(s) using either a "pass-through" or "bypass" scanner traffic path as described below:

Bypass Scan: Scanner traffic is sent to the client website directly, bypassing server(s) 3 completely. Traffic is sent from a different network which is not part of the server 3 customer traffic network; or is sent from the server 3 customer traffic network itself but uses routing to bypass the shielding application 17 (which may include Web Application Firewall clusters and other mitigation devices).

Pass-through Scan—IP: Scanner traffic is sent to server 3 and is proxied in the same manner as all normal user traffic; except that blocking of detected attack traffic is disabled, and no mitigation of security issues is active; allowing the scan to detect all possible vulnerabilities within the client website without impediment by the shield(s).

This scan type is identified using the source IP address of the scanner server 3 to determine which traffic may be allowed to pass without shielding. A list of trusted source IP addresses is maintained within the server 3.

Pass-through Scan—Other Methods: The following methods may also be used to identify scanner traffic as being permitted to pass through server 3 without blocking:
SSL client certificate.
HTTP Header insertion of any custom header into each request with digital signature to ensure authenticity. eg header name "X-Bypass-Scanner", value=cryptographic hash of metadata such as source IP or a unique key value included in the request.
HTTP request body or other identifiable content within each scan request, or identifying the connection overall and all scan requests within it, as being trusted and eligible to pass through without being blocked or modified. For example, insertion of an identifiable cryptographic hash of metadata such as source IP or a unique key value included in the request.

The system 1 is configured to detect scanner traffic having the above characteristics, and allow such traffic to pass through without being blocked.
i) System 1 is configured to allow pass-through scans 23 to pass straight through the shield server(s) 3 without being blocked. These scans identify all detectable vulnerabilities present in the client's website 5, for which system 1 may or may not be providing mitigation.

j) The shielded client website is then scanned 25 with blocking of scan traffic allowed on an equal basis to any internet user or attacker (no privileged traffic path or pass-through being provided). and validate that the shields are up and working to mitigate the known vulnerabilities within the client website 5. This may be done in two ways:

a. Following completion of both the first pass-through or bypass scanning 23, and the second shielded scanning 25, the scan results are parsed and analysed by the scanning system 19 in order to compare the scan results obtained by pass-through or bypass scanning 23 with the results obtained by shielded scanning 25. This comparison may be used to verify that all vulnerabilities are now shielded or to identify those vulnerabilities which still exist still require shielding.

b. analyse the triggers caused by every shield. A trigger in this context may be a message, signal or other form of acknowledgement that the shield(s) functions positively recognised the first and/or second signals and therefore successfully triggered a shielding event.

k) Attack traffic which is detected is correlated with vulnerability data to increase the accuracy of risk profiling. Attacks which relate to shielded or unshielded vulnerabilities may be treated as being more relevant/of a higher risk and therefore a priority for analysis and response.

We believe that this process of double-scanning with one scan hitting the shields and one passing through or bypassing, is unique.

Attack Correlation

Figure 1:
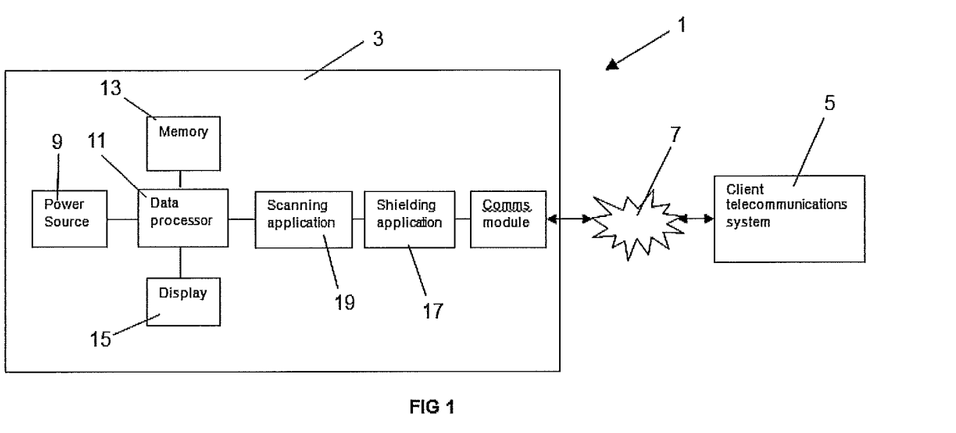
FIG. 1 is a schematic of a telecommunications defence system in accordance with the invention, in communication with a telecommunication network.
Figure 2:
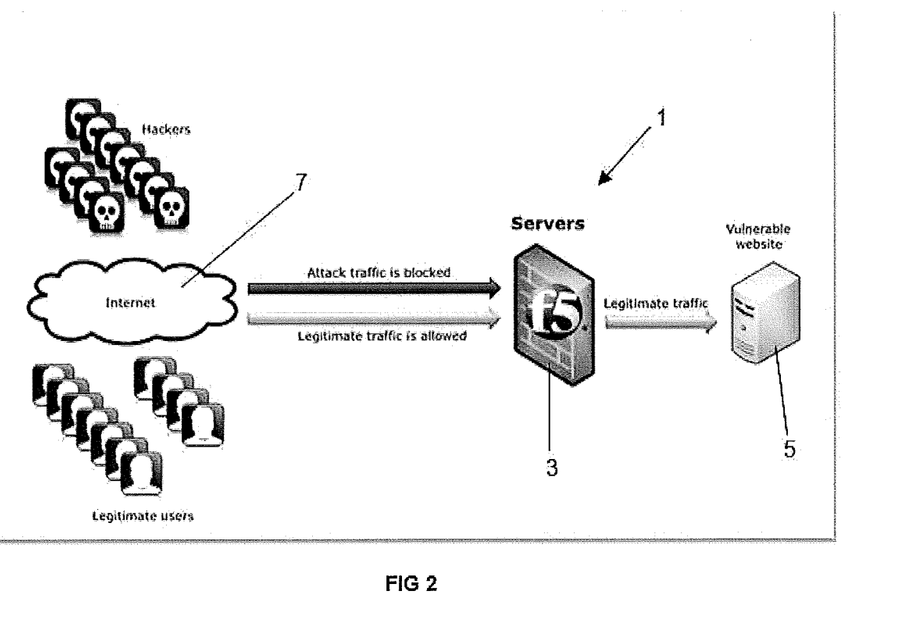
FIG. 2 is another schematic of the telecommunications defence system of FIG. 1.
Figure 3:
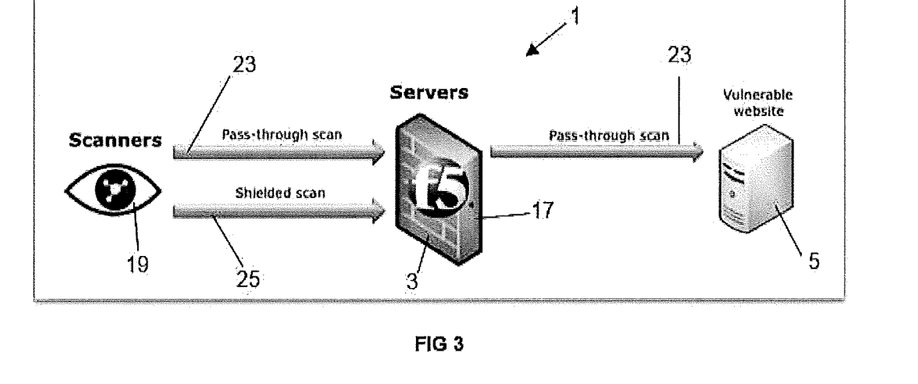
FIG. 3 is another schematic of the telecommunications defence system of FIGS. 1 and 2, performing a scanning and shielding function.
Figure 4:
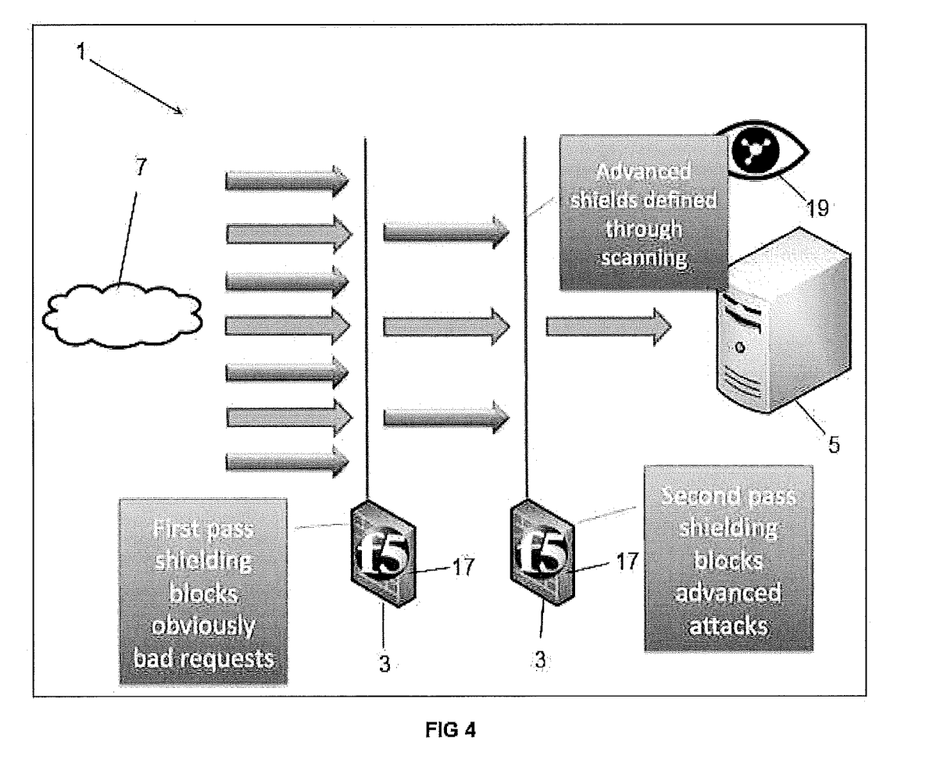
FIG. 4 is another schematic of the telecommunications defence system of FIGS. 1 to 3, in use.

With particular reference to FIG. 4, due to the way that the system relates a shield or shields to a particular vulnerability or vulnerabilities, the system 1 is able to correlate attack traffic to the vulnerabilities they would have hit.

In this example, multiple shielding applications 17A, 17B are provided, and may be provided on the same or different servers 3.

In the example shown, seven requests hit the first shielding application 17A, which provides a first shielding function against attacks. Four of these requests are obviously invalid and so are blocked by the first shield application 17A. Three of the requests pass through the first shield application 17A and hit the advanced shields 17B. One request goes through. The two blocked requests that hit the advanced shields 17B can be reported as a "true save", where the system 1 can measure and demonstrate how the unmitigated, ie unshielded request would have damaged the client website 5.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A telecommunications defense system comprising at least one server, comprising at least one processor and memory, adapted to be in communication with a client telecommunications system via a telecommunications network, the telecommunications defense system comprising a shielding application and a scanning application;

a) the shielding application containing instructions which, when executed on the at least one server, cause the server to generate a shield signal which provides at least one shield operative to shield the client telecommunications system from at least one external vulnerability;

b) the scanning application containing instructions which, when executed on the at least one server, generate a first scanning signal over the telecommunications network which scans the client telecommunications system for vulnerabilities without being shielded from the client telecommunications system by the shield, wherein the telecommunications defense system produces a first vulnerability signal indicative of any vulnerabilities of the client telecommunications system determined by the first scanning signal;

c) the scanning application containing further instructions, which when executed on the at least one server, generate a second scanning signal over the telecommunications network which scans the client telecommunications system for vulnerabilities whilst being shielded from the client telecommunications system by the at least one shield, wherein the telecommunications defense system produces a second vulnerability signal indicative of any vulnerabilities of the client telecommunications system determined by the second scanning signal;

d) the telecommunications defense system being further operative to compare the first and second vulnerability signals and to generate an output signal based on the comparison, and indicative of any unshielded vulnerabilities.

2. The system of claim 1 wherein the scanning application and the shielding application are provided on, or in communication with, a single server.

3. The system of claim 1 wherein the scanning application and the shielding application are provided on, or in communication with, multiple servers in a server network.

4. The system of claim 1 wherein the first scanning signal is arranged to bypass the at least one shield.

5. The system of claim 4 wherein the first scanning signal is arranged to bypass the server altogether.

6. The system of claim 4 wherein the first scanning signal is routed through the server but bypasses the at least one shield.

7. The system of claim 1 wherein the first scanning signal is arranged to pass-through the server, that is, the first scanning signal is routed to the client telecommunications system via the server.

8. The system of claim 1 wherein the first scanning signal comprises an identifier generated by the scanning application, which identifier is used by the system to control the routing of the first scanning signal and allow the first scanning signal to reach the client telecommunications system.

9. The system of claim 8 wherein the identifier comprises the source IP address of the server.

10. The system of claim 8 wherein the identifier comprises an electronic security certificate.

11. The system of claim 8 wherein the identifier comprises an electronic signature comprising part of the first scanning signal.

12. The system of claim 11 wherein the electronic signature is embedded into a header of the first scanning signal.

13. The system of claim 1 further arranged to generate a pre-scan signal arranged to perform a pre-scan of the client telecommunications system so as to identify vulnerabilities of the client telecommunications system before the first scan is performed, the shielding application being arranged to generate a shield signal or signals in response to the vulnerabilities identified in the pre-scan.

14. The system of claim 1 wherein the server comprises part of the client telecommunications system.

15. The system of claim 1 wherein the server is a remote server in communication with the client telecommunications system.

16. The system of claim 1 wherein the shield application comprises, or is operative to generate or activate, a shield or shields comprising a web application firewall (WAF).

17. The system of claim 1 wherein the shield application comprises a shield generator operative to provide mitigation against a particular vulnerability of the client telecommunications system that is identified by the first or second scans by generating or activating an additional shield or shields, in dependence upon a third vulnerability signal.

18. The system of claim 17 wherein the shield generator comprises a programmable shield application, stored on, or arranged to be in communication with, the server.

19. The system of claim 1 wherein the output signal is indicative of the effectiveness of the shielding of the client telecommunications system.

20. The system of claim 1, arranged to generate a correlation signal, correlating an attack detected on the client telecommunications system, with a vulnerability identified by the first or second scans.

21. The system of claim 20 wherein the correlation signal is processed to generate an alarm signal.

22. A server or server network, comprising at least one processor and memory, of a telecommunications defense system, the server being adapted to be in communication with a client telecommunications system via a telecommunications network, the server or server network comprising a shielding application and a scanning application;
   a) the shielding application containing instructions which, when executed on the at least one server, cause the server to generate a shield signal which provides at least one shield operative to shield the client telecommunications system from at least one external vulnerability;
   b) the scanning application containing instructions which, when executed on the at least one server, generate a first scanning signal over the telecommunications network which scans the client telecommunications system for vulnerabilities without being shielded from the client telecommunications system by the shield, wherein a first vulnerability signal is produced indicative of any vulnerabilities of the client telecommunications system determined by the first scanning signal;
   c) the scanning application containing further instructions, which when executed on the at least one server, generate a second scanning signal over the telecommunications network which scans the client telecommunications system for vulnerabilities whilst being shielded from the client telecommunications system by the at least one shield, wherein a second vulnerability signal is produced indicative of any vulnerabilities of the client telecommunications system determined by the second scanning signal;
   d) the server being further operative to compare the first and second vulnerability signals and to generate an output signal based on the comparison, and indicative of any unshielded vulnerabilities.

23. A method of defending a client telecommunications system using a telecommunications defense system comprising at least one server comprising at least one processor and memory, adapted to be in communication with the client telecommunications system via a telecommunications network, the telecommunications defense system comprising a shielding application and a scanning application; the method comprising steps of:
   a) executing instructions of the shielding application on the at least one server to cause the server to generate a shield signal which provides at least one shield operative to shield the client telecommunications system from at least one external vulnerability;
   b) executing instructions of the scanning application on the at least one server to generate a first scanning signal over the telecommunications network which scans the client telecommunications system for vulnerabilities without being shielded from the client telecommunications system by the shield;
   c) producing a first vulnerability signal indicative of any vulnerabilities of the client telecommunications system determined by the first scanning signal;
   d) executing further instructions of the scanning application on the at least one server to generate a second scanning signal over the telecommunications network which scans the client telecommunications system for vulnerabilities whilst being shielded from the client telecommunications system by the at least one shield;
   e) producing a second vulnerability signal indicative of any vulnerabilities of the client telecommunications system determined by the second scanning signal;
   f) comparing the first and second vulnerability signals and generating an output signal based on the comparison, and indicative of any unshielded vulnerabilities.

24. A telecommunications network comprising a telecommunications defense system provided with at least one server comprising at least one processor and memory, adapted to be in communication with a client telecommunications system via a telecommunications network, the telecommunications defense system comprising a shielding application and a scanning application;
   a) the shielding application containing instructions which, when executed on the at least one server, cause the server to generate a shield signal which provides at least one shield operative to shield the client telecommunications system from at least one external vulnerability;
   b) the scanning application containing instructions which, when executed on the at least one server, generate a first scanning signal over the telecommunications network which scans the client telecommunications system for vulnerabilities without being shielded from the client telecommunications system by the shield, wherein the telecommunications defense system produces a first vulnerability signal indicative of any vulnerabilities of the client telecommunications system determined by the first scanning signal;

c) the scanning application containing further instructions, which when executed on the at least one server, generate a second scanning signal over the telecommunications network which scans the client telecommunications system for vulnerabilities whilst being shielded from the client telecommunications system by the at least one shield, wherein the telecommunications defense system produces a second vulnerability signal indicative of any vulnerabilities of the client telecommunications system determined by the second scanning signal;

d) the telecommunications defense system being further operative to compare the first and second vulnerability signals and to generate an output signal based on the comparison, and indicative of any unshielded vulnerabilities.

* * * * *